US 8,555,738 B2

(12) United States Patent
Heinzelmann

(10) Patent No.: US 8,555,738 B2
(45) Date of Patent: Oct. 15, 2013

(54) DEVICE FOR REDUCING RATTLING NOISES IN VARIABLE-SPEED TRANSMISSIONS

(75) Inventor: Karl-Fritz Heinzelmann, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/494,311

(22) Filed: Jun. 12, 2012

(65) Prior Publication Data

US 2012/0247244 A1    Oct. 4, 2012

Related U.S. Application Data

(62) Division of application No. 12/408,985, filed on Mar. 23, 2009, now Pat. No. 8,225,688.

(30) Foreign Application Priority Data

Mar. 26, 2008  (DE) .......................... 10 2008 000 822

(51) Int. Cl.
*F16H 3/08* (2006.01)

(52) U.S. Cl.
USPC .............................. 74/331; 384/517; 384/535

(58) Field of Classification Search
USPC .......... 74/325, 3.29, 331, 333, 339, 348, 371, 74/372, 329; 384/517, 518, 535
See application file for complete search history.

(56) References Cited

U.S. PATENT DOCUMENTS

| | | | |
|---|---|---|---|
| 2,246,996 A | 6/1941 | Kreis | |
| 3,838,759 A * | 10/1974 | Schmoelz et al. | 74/371 |
| 3,900,232 A | 8/1975 | Rode | |
| 5,061,089 A * | 10/1991 | Bair et al. | 384/535 |
| 5,370,013 A | 12/1994 | Reynolds et al. | |
| 5,836,206 A | 11/1998 | Craft | |
| 6,463,822 B1 * | 10/2002 | Bader et al. | 74/333 |
| 6,661,141 B1 | 12/2003 | Omi | |
| 6,848,831 B2 | 2/2005 | Shimizu | |
| 6,849,977 B2 * | 2/2005 | Walther et al. | 310/90 |
| 6,886,425 B2 | 5/2005 | Petzold | |
| 7,334,493 B2 | 2/2008 | Renner | |
| 2006/0112778 A1 | 6/2006 | Renner | |
| 2009/0080823 A1 * | 3/2009 | Bauch et al. | 384/518 |
| 2009/0205450 A1 | 8/2009 | Gitt | |

FOREIGN PATENT DOCUMENTS

| | | |
|---|---|---|
| DE | 42 26 627 | 2/1993 |
| DE | 10 2004 009 472 | 9/2005 |
| DE | 10 2004 057 126 A1 | 8/2006 |
| DE | 10 2006 038 193 | 2/2008 |
| EP | 0 075 408 * | 3/1983 |

* cited by examiner

*Primary Examiner* — William C Joyce
(74) *Attorney, Agent, or Firm* — Davis & Bujold, PLLC; Michael J. Bujold

(57) ABSTRACT

A device for reducing rattling noises in a variable-speed transmission having a main shaft, two countershafts and gear wheels that are mounted, with some radial play relative to the main shaft, for rotation around the main shaft. To engage a gear, a respective loose gearwheel can be connected in a rotationally fixed manner to the main shaft. In a first embodiment, at least one loose gearwheel is mounted on the main shaft by at least one roller bearing, and the roller bearing is axially fixed relative to the main shaft by at least one flexibly resilient element. In a second embodiment, the loose gearwheel is supported, by a roller bearing on a component that is fixed to the housing and has radial play. The roller bearing is axially fixed relative to the component fixed to the housing by at least one flexibly resilient element.

14 Claims, 2 Drawing Sheets ns with two countershafts is known, such that a pressing device arranged on the main shaft presses one of the loose wheels in the axial direction against a buffer disk. This axial bracing of the loose wheels is intended to prevent undesired rattling noise. With a pressing device as described in DE 102004057126 A1 sliding friction takes place during operation between the pressing device and the loose wheel. This sliding friction increases the friction losses of the transmission and results in wear.

The purpose of the present invention is to provide a variable-speed transmission with two countershafts, which operates at a low noise level and with low friction losses.

DEVICE FOR REDUCING RATTLING NOISES IN VARIABLE-SPEED TRANSMISSIONS

This application is a divisional of U.S. application Ser. No. 12/408,985 filed Mar. 23, 2009 which claims priority from German application serial no. 10 2008 000 822.2 filed Mar. 26, 2008.

FIELD OF INVENTION

The present invention concerns a device for reducing rattling noises in variable-speed transmissions with two countershafts.

BACKGROUND OF THE INVENTION

Variable-speed transmissions with two countershafts and a central main shaft are known from the prior art. Main shaft gearwheels arranged to rotate on the main shaft are driven by the gearwheels on the countershafts. Only when operating in the associated gear are the main shaft gearwheels connected in a rotationally fixed manner to the main shaft. In other operating phases the main shaft gearwheels rotate loosely on the main shaft. Thus, the main shaft gearwheels are also called loose gearwheels.

For the purpose of load equalization between the force flows through the two countershafts, in such transmissions the main shaft is mounted in as floating manner, i.e. with some radial play. The loose gearwheels are always axially fixed on the floating main shaft, but not in the radial direction. In the radial direction the loose gearwheels are guided and mounted in the teeth of the countershaft gearwheels that mesh with the loose wheels. This achieves optimum load equalization.

The loose wheels of gears not engaged at the time are in the load-free condition and float within the tooth play, i.e. they have some play in the radial and circumferential direction relative to the main shaft and relative to the gearwheels of the countershafts.

However, due to the play of the loose wheels in the load-free condition an unpleasant rattling noise is produced during operation because the gearwheels manufacturing imprecisions and by rotation fluctuations from the drive input and/or the drive output. Owing to these accelerations the loose gearwheels move about within the movement clearance range described and impact the adjacent components. For example, the tooth flanks of teeth engaged with one another strike one another within the range of their tooth flank clearance, and this is the main cause of the rattling from the gearwheels co-rotating while not under load.

Solutions have already been proposed for reducing rattle noise in variable-speed transmissions with two countershafts. For example, from DE 102004057126 A1 a device for reducing the axial movement of the loose gearwheels in a transmission with two countershafts is known, such that a pressing device arranged on the main shaft presses one of the loose wheels in the axial direction against a buffer disk. This axial bracing of the loose wheels is intended to prevent undesired rattling noise. With a pressing device as described in DE 102004057126 A1 sliding friction takes place during operation between the pressing device and the loose wheel. This sliding friction increases the friction losses of the transmission and results in wear.

The purpose of the present invention is to provide a variable-speed transmission with two countershafts, which operates at a low noise level and with low friction losses.

SUMMARY OF THE INVENTION

A first version of the claimed invention comprises a device for reducing rattling noises in variable-speed transmissions having a main shaft and two countershafts. The device comprises loose gearwheels that can rotate around the main shaft, which are mounted with some radial play relative to the main shaft. To engage a gear, in each case, one loose wheel is connected in a rotationally fixed manner to the main shaft. According to the invention at least one loose wheel of the variable-speed transmission is mounted on the main shaft by means of at least one roller bearing, the roller bearing having some radial play relative to the main shaft and being braced relative to the mainshaft by an spring element acting in the axial direction. Thus, the roller bearing is axially fixed on the main shaft by the spring element, but its radial mobility is not completely prevented.

A second embodiment of the invention differs from the first one in that instead of being mounted on the main shaft, the roller bearing is mounted with radial play on a component of the variable-speed transmission that is fixed to the housing, the roller bearing being pressed and braced against the said component fixed to the housing by an spring element that applies force in the axial direction.

In both of the embodiments described, movements and vibrations of the loose gearwheels in the radial direction are damped or prevented by mechanically bracing the spring element, so that the loose wheels that are not involved in the force flow at least no longer impact so strongly against the adjacent elements and the noise produced thereby is substantially reduced. Despite this, the radial play required for load equalization as described earlier is still present.

The rotational movement of the loose gearwheel is not influenced or impeded by being axially fixed by the spring element, because the spring element engages one of the bearing rings of the roller bearing and axial friction, via the roller bearing is not transferred to the loose wheel. Thus, only movements of the loose wheel in the radial direction are damped or braked. Accordingly, there is much less sliding friction and thus less friction loss in the transmission than in the transmission described in the prior art, in which the rotational movement of the loose ring is also affected by sliding friction owing to the axial restraint.

In both of the above embodiments the spring element can directly contact one of the bearing rings of the roller bearing. However, spacer rings or friction rings can also be arranged between the spring element and the roller bearing. Interposed elements can also be arranged between the roller bearing and the main shaft or the component fixed to the housing, respectively. For example, the radial movements of the loose wheel can be influenced by friction rings between the roller bearing and the spring element, in that by an appropriate choice of material and surface condition for the friction rings a quite specific coefficient of friction can be produced between the friction ring and the spring element or roller bearing.

A preferred feature of the invention is characterized in that no axial force is transferred by the roller bearing. For example, the roller bearing is mounted so that the bearing ring of the roller bearing associated with the loose wheel can move axially, for example with a clearance fit, relative to the loose gearwheel. Thus, the roller bearing does not transmit any axial forces, that influence the axial bracing, from the loose bearing to the main shaft.

Mounting of the roller bearing can also be realized with a roller bearing race in such manner that no axial forces are transferred. For this, for example a roller bearing race can be used which has only one bearing ring, this bearing ring being arranged on the main shaft and the rolling bodies of the roller bearing rolling directly on the surface of the central bore of the loose gearwheel. Thus, the loose wheel is not axially fixed relative to the rolling bodies and therefore also relative to the main shaft. In this way the axial bracing force of the spring element is left free and uninfluenced by other axial forces.

According to a further preferred design the loose gearwheel is supported in the axial direction between two buffer disks that are axially fixed on the main shaft. In this way, for example axial forces produced by operation of oblique-toothed spur gears or when the associated gear is engaged, are transferred directly via the buffer disks to the main shaft, without influencing the axial bracing force of the spring element on the roller bearing. Particularly in combination with the above-described, axial-force-free mounting on the roller bearing can be utilized. With a constant, calculable and preadjustable axial bracing force, constant damping of the movements in the radial direction can be ensured.

The roller bearing and the spring element can be supported relative to the main shaft against the same buffer disk on which the loose gearwheel is also supported in the axial direction. However, it is also possible to arrange one or two further buffer disks that are axially fixed on the main shaft to axially support the spring element.

With its axial bracing force, the spring element can act either upon the inner, or the outer bearing ring of the roller bearing. Preferably, the spring element acts on the inner bearing ring of the roller bearing, which is associated with the main shaft or the component fixed to the housing. Thus, the spring element is not arranged on the loose gearwheel but, on the bearing ring seated on the main shaft or on the bearing ring associated with the component fixed to the housing.

The spring element is preferably in the form of a cup spring or a packet of cup springs. However, other elastic or springy elements can also be used, such as spiral springs, corrugated springs, leaf springs or rings made of an elastic material.

The device according to the invention can be used in any gear of a variable-speed transmission, i.e. with forward and reverse gears. However, it can also be used only in particular gears.

The present invention also includes a variable-speed transmission with a device for reducing rattling noise.

Finally, according to a preferred embodiment a variable-speed transmission is claimed, in which the device for reducing rattling noise is provided only for the reverse gear. Surprisingly, it has been found that this measure substantially reduces rattling noise in all the gears. That is attributed to the fact that the rattling noise in all the gears is mainly caused by vibrations in the reverse gear Thanks to the reduction of vibrations, according to the invention, of the loose gearwheels and thus of the rattling noise in the reverse gear, the rattling noise of the entire transmission is reduced because due to the reduction of vibration in the reverse gear, the forward gears too tend to rattle considerably less. Thus, with little design and structural complexity a reduction of annoying rattling noise throughout the transmission can be achieved.

The advantage of using the rattle noise reduction measures only in the reverse gear is also very great because a vehicle's transmission operates mainly in one of the forward gears, while the reverse gear co-rotates under no load and, in a conventional transmission, produces rattling noise. The advantages of the present invention come into their own precisely during these timewise predominant operating phases.

BRIEF DESCRIPTION OF THE DRAWINGS

Two example embodiments of the invention are illustrated in the figures and will be described in more detail below. The figures show.

DETAILED DESCRIPTION OF THE PREFERRED EMBODIMENTS

Figure 1:
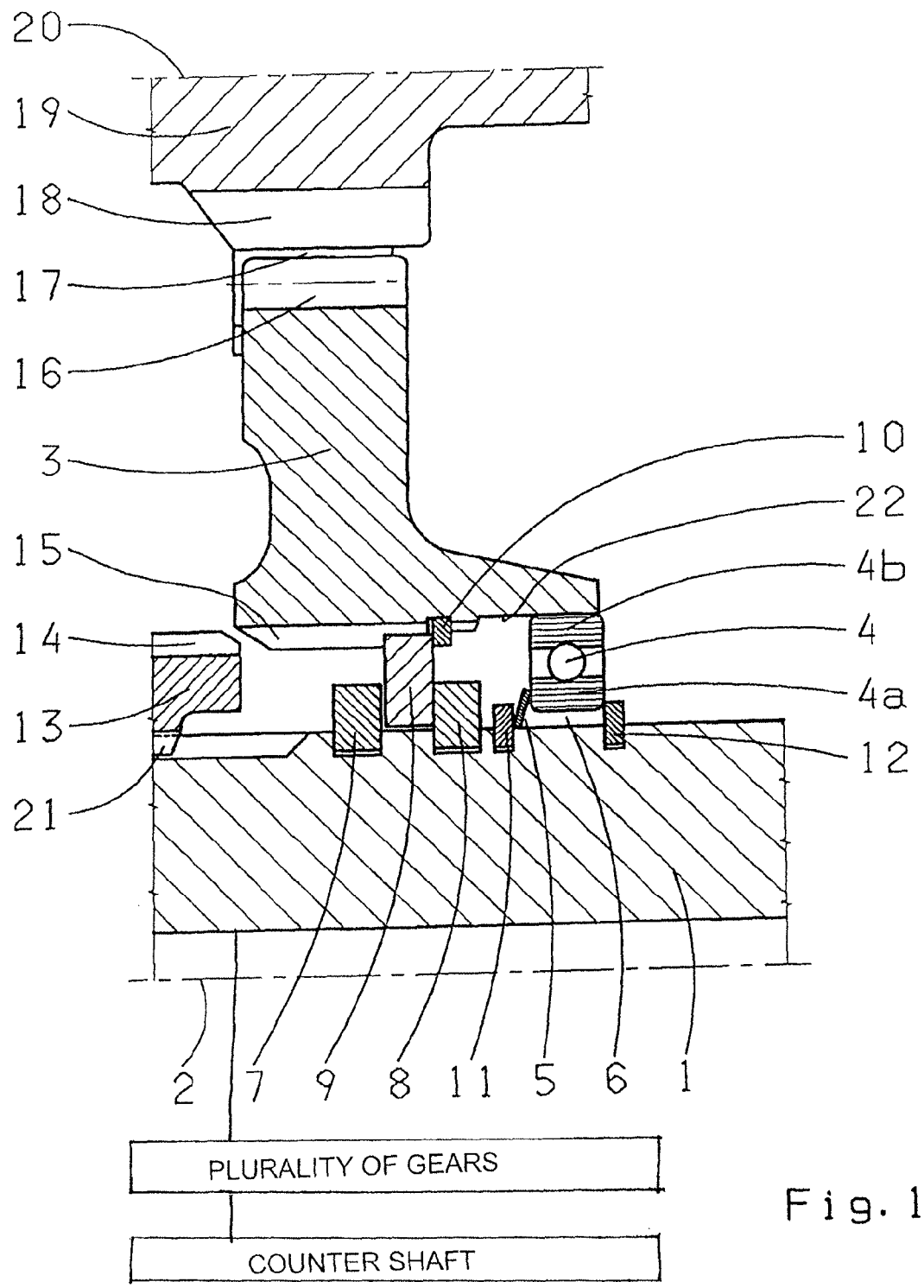
FIG. 1: Schematic sectional view of the area of the reverse gear in a variable-speed transmission with a first embodiment of the invention.

The embodiment shown in FIG. 1 comprises a loose gearwheel 3 for the reverse gear, which is fitted to rotate around the main shaft 1 and its central axis 2. In the load-free condition, i.e. when the reverse gear is not engaged, the loose gearwheel 3 is driven by the countershaft 19 via an intermediate gear 17. The intermediate gear 17 brings about the reversal of rotation direction that is required for the reverse gear. For this purpose the teeth 18 of the countershaft mesh with spur teeth of the intermediate gear 17. In turn, the spur teeth of the intermediate gear 17 engage with the spur teeth 16 of the loose gearwheel 3. In the representation shown, the intermediate gear 17 is outside the plane of the drawing and is largely hidden from view by the teeth 18 of the countershaft and those of the loose gearwheel 3.

To engage the reverse gear, the loose gearwheel 3 is connected in a rotationally fixed manner to the main shaft 1 by moving the shift sleeve 13 in the direction of the loose gearwheel 3. The outer teeth 14 of the shift sleeve 13 then engage with the inner teeth 15 of the loose gearwheel 3. By means of the inner teeth 21 of the shift sleeve 13, the shift sleeve is connected in a rotationally fixed manner but axially movably on the main shaft 1.

The loose gearwheel 3 is supported in the axial direction via an intermediate ring 9 against buffer disks 7 and 8 that are connected to the main shaft 1 in axially fixed positions. The intermediate ring 9 is fixed by a circlip 10 near a bore of the loose wheel 3.

In the radial direction the loose gearwheel 3 is mounted on the main shaft 1 via a roller bearing 4. There is a gap 6 radially between the roller bearing 4 and the main shaft 1, which allows radial movement between the loose wheel 3 and the main shaft 1. However, the radial movements are damped by the mechanical bracing produced by an spring element in the form of a cup spring 5 between the main shaft 1 and the inner ring 4a of the roller bearing 4.

The radial gap 6 between the loose gearwheel 3 and the main shaft 1, and the floating mounting of the main shaft 1, have the result that the central axes of the main shaft and the loose gearwheel are not always exactly coaxial with one another. However, the loose gearwheel 3 can still rotate about the main shaft 1 even if the central axes of the two components do not coincide.

The roller bearing 4 enables the loose gearwheel 3 to rotate around the main shaft 1 with minimal friction loss and at the same time, due to its bracing relative to the main shaft 1, ensures that the radial movements between the main shaft 1 and the loose gearwheel 3 are damped.

The cup spring 5 axially abuts a buffer disk 11 that is connected in an axially fixed manner to the main shaft 1. Another buffer disk 12 connected in an axially fixed manner to the main shaft 1 supports the inner ring 4a of the roller bearing 4 against axial force from the cup spring 5. The roller bearing 4 is fitted into the bore 22 of the loose gearwheel 3 with a clearance fit, so that only inconsiderable axial forces are ever transmitted between the outer bearing ring 4b and the loose gearwheel 3.

The buffer disks 7, 8, 11 and 12 are each in axially fixed ink position within a circumferential groove in the main shaft 1. Designs are also possible in which only two buffer disks are needed to fix and support both the loose gearwheel 3 and the cup spring 5 and roller bearing 4 in the axial direction.

Figure 2:
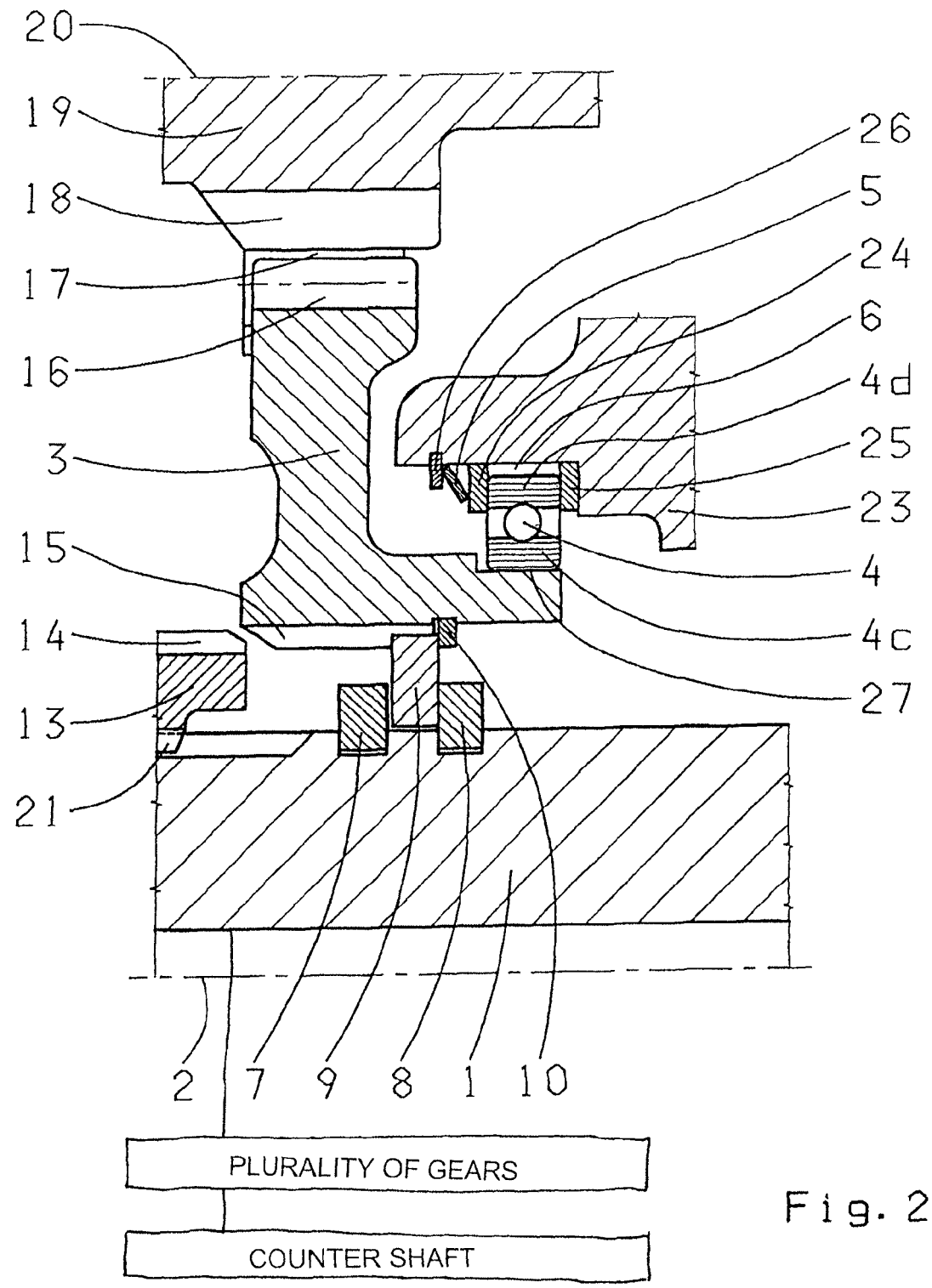
FIG. 2: Schematic sectional view of the area of the reverse gear in a variable-speed transmission with a second embodiment of the invention.

FIG. 2 shows a second embodiment. The loose gearwheel 3 is mounted radially in a component 23 that is fixed to the housing. The basic arrangement of the main shaft 1, shift sleeve 13, loose gearwheel 3, intermediate gearwheel 17 and countershaft 19 is the same as in FIG. 1. Accordingly, the same components are indexed with the same numbers and not described in any more detail here.

Axial support of the loose gearwheel 3 relative to the main shaft 1 by the two buffer disks 7 and 8 is also the same as described earlier in relation to FIG. 1.

The design of the radial mounting of the loose gearwheel 3 in FIG. 2 differs from the embodiment in FIG. 1. In FIG. 2 the roller bearing 4 is fitted on the cylindrical outer surface 27 of the hub of the loose gearwheel 3. For this purpose the said outer surface 27 of the hub of the loose gearwheel 3 is partially machined in order to be given a suitable surface for seating the roller bearing 4. The inner bearing ring 4*c* of the roller bearing 4 is arranged with a clearance fit on the outer surface 27, so that only inconsiderable axial forces are transmitted from the loose gearwheel 3 to the roller bearing 4.

The outer bearing ring 4*d* of the roller bearing 4 is supported to have a radial gap 6 with respect to the transmission housing 23. The outer bearing ring 4*d* is axially fixed on one side by an intermediate ring 25 and on the other side by an interposed ring 24, a cup spring 5 and a buffer disk 26 against the transmission housing 23. The cup spring 5 biases the outer bearing ring 4*d* axially against the transmission housing 23, so that the movements and vibrations made possible by the radial gap 6 are damped.

The roller bearing 4 enables the loose gearwheel 3 to rotate around the main shaft 1 with minimal friction loss and at the same time, being forced against the transmission housing, ensures that the radial movements of the loose gearwheel 3 are damped. This considerably reduces rattling noise.

The buffer disk 26 is in the form of a retaining ring or Seeger-type circlip, and is arranged axially fixed in a circumferential groove in the transmission housing. By choosing the properties of the surfaces of the intermediate rings 24 and 25 the damping of the radial movements between the loose gearwheel 3 and the transmission housing 23 can be influenced, because the surfaces of the intermediate rings 24 and 25 act as friction surfaces against the outer bearing ring 4*d* during radial movements of the roller bearing 4.

Another possibility for influencing the intensity of the damping of the radial movements between the loose gearwheel 3 and the transmission hosing 23 is to choose the dimensions of the cup spring 5 and its spring characteristic.

With the embodiments described, it is also possible to arrange one or more cup springs on each side of the roller bearing 4. This too can influence the damping of the radial movements between the loose gearwheel 3 and the main shaft 1 or the transmission housing 23.

INDEXES

1 Main shaft
2 Central axis
3 Loose gearwheel
4 Roller bearing
5 Cup spring
6 Gap
7 Buffer disk
8 Buffer disk
9 Intermediate ring
10 Circlip
11 Buffer disk
12 Buffer disk
13 Shift sleeve
14 Outer teeth
15 Inner teeth
16 Teeth
17 Intermediate gearwheel
18 Teeth
19 Countershaft
20 Central axis
21 Teeth
22 Bore
23 Transmission housing
24 Intermediate ring
25 Intermediate ring
26 Buffer disk
27 Outer surface

The invention claimed is:

1. An assembly for reducing rattling noises in a variable-speed transmission, the assembly comprising:
a main shaft (1);
two countershafts;
a plurality of loose gearwheels (3) being supported for rotation about the main shaft (1) and each of the plurality of loose gearwheels (3) being spaced radially relative to the main shaft (1);
a transmission gear being engaged when a respective loose gearwheel (3) is rotationally fixed to the main shaft (1), at least one roller bearing (4), supported by a housing (23), supporting at least one of the plurality of loose gearwheels (3) of the variable-speed transmission for rotation about the main shaft (1), a gap (6) radially separating the roller bearing (4) from the housing (23) to provide radial movement between the at least one roller bearing and the housing (23), and the roller bearing (4) being axially braced, relative to the housing (23), by at least one spring element (5) which applies an axial force on the roller bearing (4) for dampening radial movement of the at least one bearing; and
an inner bearing ring of the roller bearing (4) being located adjacent to and only directly engaging with the loose gearwheel (3) such that the inner roller bearing ring, of the roller bearing, is free from direct contact with any other support means for the roller bearing (4) while permitting axial movement of the loose gearwheel (3) relative to the roller bearing (4) during operation of the variable-speed transmission.

2. The assembly according to claim 1, wherein the loose gearwheel (3), of the plurality of loose gearwheels, is supported via an intermediate ring (9) which is sandwiched between a first pair of buffer disks (7, 8) which are supported by the main shaft (1) so as to restrict axial movement of the intermediate ring (9), and both the at least one spring element (5) and the outer bearing ring (4*d*) are sandwiched between a buffer disk (11) and the housing (23) so as to restrict axial movement of the outer bearing ring (4*d*) and the at least one spring element (5).

3. The assembly according to claim 1, wherein the assembly for reducing rattling noise in the variable-speed transmission influences engagement of a reverse transmission gear.

4. A variable-speed transmission having an assembly for reducing rattling noise in the variable-speed transmission, the assembly for reducing rattling noises in the variable-speed transmission comprising:

a main shaft (1), two countershafts, and a plurality of loose gearwheels (3) being supported for rotation about the main shaft (1) and having a radial gap relative to the main shaft (1), a transmission gear being engaged when a respective loose gearwheel (3) is rotationally fixed to the main shaft (1), at least one gearwheel, of the plurality of loose gearwheels (3) of the variable-speed transmission, being supported by at least one roller bearing (4) so as to be rotatable with the main shaft (1), a ring gap (6) radially separating an outer bearing ring (4*d*) of the roller bearing (4) from a transmission housing (23) to provide radial movement between the at least one roller bearing (4) and the transmission housing (23), and the roller bearing (4) being axially braced, relative to the transmission housing (23), by at least one spring element (5) which applies an axial force against an outer bearing ring (4*d*) of the roller bearing (4) so that the movements and vibrations, made possible by the radial gap, are damped, and an inner bearing ring (4*c*) of the roller bearing (4) being located adjacent to and only engaging with the loose gearwheel (3) so as not to be in direct contact with any other support means for the roller bearing (4) while permitting axial movement of the loose gearwheel (3) relative to the roller bearing (4) during operation of the variable-speed transmission.

5. The variable-speed transmission according to claim 4, wherein the roller bearing (4) only supports the at least one loose gearwheel.

6. The variable-speed transmission according to claim 4, wherein the loose gearwheel (3) is supported by an intermediate ring that is axially braced between two buffer disks (7, 8) that are axially fixed to the main shaft (1).

7. The variable-speed transmission according to claim 4, wherein the spring element (5) axially braces an outer bearing ring (4*d*) of the roller bearing (4).

8. The variable-speed transmission according to claim 4, wherein the spring element (5) is one of a cup spring and a packet of cup springs.

9. The variable-speed transmission according to claim 4, wherein the loose gearwheel (3), of the plurality of loose gearwheels, is supported via an intermediate ring (9) which is sandwiched between a pair of buffer disks (7, 8) which are supported by the main shaft (1) so as to restrict axial movement of the intermediate ring (9).

10. The variable-speed transmission according to claim 4, wherein the at least one spring element (5) directly abuts against an interposed ring (24) which directly abuts against an outer bearing ring (4*d*) of the roller bearing (4), and the at least one spring element (5), the interposed ring (24) and the inner bearing ring (4*a*) are sandwiched between a buffer disk (26) and a transmission housing (23) so as to restrict axial movement of the inner bearing ring (4*a*) and the at least one spring element (5).

11. The variable-speed transmission according to claim 4, wherein the assembly for reducing rattling noise in the variable-speed transmission influences engagement of a reverse transmission gear.

12. An assembly for reducing rattling noises in a variable-speed transmission, the assembly comprising:

a main shaft (1), two countershafts, and at least one loose gearwheel (3) being supported for rotation about the main shaft (1) and the at least one loose gearwheel (3) being spaced radially relative to the main shaft (1), a transmission gear being engaged when the at least one loose gearwheel (3) is rotationally fixed to the main shaft (1), the at least one loose gearwheel (3) of the variable-speed transmission being supported by at least one roller bearing (4) so as to be rotatable with the main shaft (1), a gap (6) radially separating the at least one roller bearing (4) from a component (23) that is fixed in relation to a transmission housing to provide radial movement between the at least one roller bearing (4) and the component (23), and the at least one roller bearing (4) being axially braced, relative to the component (23) that is fixed in relation to the transmission housing, by at least one spring element (5) which applies an axial force on the at least one roller bearing (4) for dampening radial movement of the at least one bearing, and an inner bearing ring (4*c*) of the roller bearing (4) being located adjacent to and only engaging with the loose gearwheel (3) such that the inner roller bearing ring of the roller bearing is free from direct contact with any other support means for the roller bearing (4) while permitting axial movement of the loose gearwheel (3) relative to the roller bearing (4) during operation of the variable-speed transmission.

13. The variable-speed transmission according to claim 12, wherein the assembly for reducing rattling noise in the variable-speed transmission influences engagement of a reverse transmission gear.

14. The variable-speed transmission according to claim 12, wherein the at least one roller bearing (4) comprises an outer bearing ring (4*d*) that is axially fixed relative to the component (23) that is fixed in relation to the transmission housing, and the outer bearing ring (4*d*) being radially spaced from the component (23) that is fixed in relation to the transmission housing by the gap (6).

\* \* \* \* \*